United States Patent [19]
Popel

[11] 3,800,050
[45] Mar. 26, 1974

[54] PREPARATION OF A PUFFED, STARCH CONTAINING FOOD PRODUCT

[76] Inventor: Gene T. Popel, 2416 Monroe Ave., San Diego, Calif. 92116

[22] Filed: Sept. 3, 1970

[21] Appl. No.: 69,477

Related U.S. Application Data

[63] Continuation of Ser. No. 485,068, Sept. 4, 1965, abandoned, which is a continuation-in-part of Ser. No. 361,940, April 23, 1964, abandoned.

[52] U.S. Cl. ............. 426/343, 99/100 P, 426/350, 426/351, 426/377, 426/440, 426/441, 426/415, 426/808, 426/510, 426/512, 426/308
[51] Int. Cl. ............................ A23l 1/10, A23l 1/12
[58] Field of Search ............ 426/309; 99/80, 81, 83, 99/100 P

[56] References Cited
UNITED STATES PATENTS

| | | | |
|---|---|---|---|
| 3,027,258 | 3/1962 | Markakis et al. | 99/81 |
| 3,174,864 | 3/1965 | Schiebel | 99/1 |
| 3,259,503 | 7/1966 | Tau et al. | 99/83 |
| 3,282,701 | 11/1966 | Nong et al. | 99/1 |
| 3,368,902 | 2/1968 | Berg | 99/83 |

*Primary Examiner*—Raymond N. Jones
*Attorney, Agent, or Firm*—Christie, Parker and Hale

[57] ABSTRACT

Puffed food products are produced by cooking a slurry of water, a foodstuff and starch containing at least 20 percent by weight amylose, thereby producing a gelatinized mass. The gelatinized mass is formed into pieces, dried and puffed.

17 Claims, No Drawings

PREPARATION OF A PUFFED, STARCH CONTAINING FOOD PRODUCT

This invention relates to a puffed food product and a process for making the product from a starch-containing food, and is a continuation of my copending application Ser. No. 485,068, filed Sept. 4, 1965, which is a continuation-in-part application of my copending application Ser. No. 361,940 filed Apr. 23, 1964, now abandoned.

At the present time many snack-food products are available commercially, including potato chips, corn chips, bacon rinds, and various puffed snack items made from starch-containing foods such as potatoes and corn. However, the puffed snack items generally available prior to this invention do not have a fresh-food taste, do not have food particles suspended in them, and cannot be made commercially with simple, inexpensive equipment.

One previous method of preparing puffed snack items involves combining a finely ground, dry starch-contaiing foodstuff with a small amount of water to produce a stiff dough which is extruded under high pressure to a flat shape, after which it is cut into small pellets, dried, and subsequently fried. Another prior method of preparing puffed snack products involves cooking a mixture of starches and starch-containing foods, allowing the cooked mixture to stand and cool in order that the gel thus formed can become firm and non-sticky so that it may be sliced, dried, and subsequently fried.

The process of this invention produces a puffed snack food item which is easily produced commercially from starch-containing foodstuffs without the use of expensive high-pressure extrusion equipment and in a continuous process without the need for a holding or refrigeration step prior to forming the product and drying it to a form which is fried to produce a product with an improved fresh-food taste.

A puffed snack food product is made in accordance with the preferred process of this invention by preparing a relatively dilute mixture of starch and water, together with flavoring materials as desired, heating the mixture sufficiently to gelatinize a substantial part of the starch in the mixture, forming a thin sheet of the gelled material, partially drying the surface of the formed gel, subdividing the surface-dried gel into pieces of convenient size, finish drying the pieces of gel, and thereafter frying the pieces in hot cooking oil to puff the pieces to a density less than the oil.

The gelatinized mixture prepared as described herein keeps the desired thin shape when it is formed into a piece and has sufficient gel strength to support discrete particles of food such as ground wheat, potatoes, corn, and the like. Preferably, such food particles are distributed through the mixture to give the final product a fresh-food taste and improve its texture and appearance.

Preferably, the mixture includes water between about 60 percent and 90 percent by weight and total starch between about 10 percent and 40 percent by weight. The term "total starch" refers to the combination of the naturally-occurring starch present in any foodstuff which may be used in the formulation plus the added starch in the formulation. The term "added starch" is used to mean additional manufactured starch products such as corn or potato starch which has been separated from a naturally-occurring foodstuff and added to the mixture to increase the gel strength of the cooked material. The term "starch" is used in the general sense to describe the polysaccharide carbohydrate found in most plant materials composed of a straight chain amylose fraction and a branched chain amylopectin fraction in varying concentrations. The term "foodstuff" is used to mean any food or edible material.

A unique feature of the invention is the inclusion in the starting mixture of a relatively high proportion of starch with a high setback or congealing power. For the purpose of this invention, starches having high "setback" are defined as those starches which set to a firm gel when cooled after cooking, specifically, those starches in which the viscosity of cooked starch pastes cooled to 50°C. is more than about 2.2 times the viscosity of the cooked paste before cooling, as described in "Graphical Analysis of the Brabender Viscosity Curves of Various Starches" by Mazurs et al. in *Cereal Chemistry*, May, 1957, pages 141–152. In general, the tendency of starch pastes to set to a firm gel is determined by the quantity of amylose or equivalent, such as acid-modified starches, in the starch. One convenient method of defining the desired formulation in accordance with this invention is by calculation of the percent amylose of the starch in the snack mixture. It has been found that if the percent of amylose in the total solids is 20 percent or higher, the extrusion and handling of the gel is greatly simplified. In determining the amylose content of the gel mixture, the data of R. W. Kerr, *Chemistry & Industry of Starch*, 2nd Ed., page 191, have been used, as follows:

| | |
|---|---|
| Corn Starch | 28% |
| Wheat Starch | 26% |
| Potato Starch | 21% |
| Tapioca Starch | 17% |
| Rice Starch | 17% |
| Sago Starch | 28% |

Specifically, in selecting the added starch for the mixture for manufacture of improved snack products, corn, wheat, or sago starches are found to give the desired gel strength, when mixed with the foodstuff in the desired range of about 25 percent solids. For operating in the higher-solids range where the viscosity of the extruded gel may tend to be too high, it is found that acid-modified or "thin-boiling" starches from any source may be substituted for the same effect.

An important advantage of this invention is that a wide variety of foodstuffs can be included in the final product.

One major class of foodstuffs which has been used successfully as starting materials for these products is dry grain, such as wheat and corn. These can be used in the process as whole grains, cracked or partially ground, or completely ground into a flour in which all particles would pass through, say, a 60-mesh screen.

Whole grains are preferably processed by soaking in water to soften the grain, followed by a grinding or comminuting process to tear apart the grain to any degree of fineness desired. This releases the starch within the grain, thereby permitting it to contribute to the gel structure which results after final gelatinization of the entire mixture. The grain may be soaked for twenty-four hours in cold water or a shorter time in hot water, say, about 6 hours at 145°F., or even less time in water at 200°F. It has been found that a moisture content of about 40 percent by weight in the soaked grain is desirable so a substantial portion of the starch within the grain particles gelatinizes during the final cooking procedure. If desired, the whole grains may be subjected to a short cooking step at 212°F. to improve flavor and color. In this case all or part of the grains may be partially gelatinized without any detriment to the finished product. The grain is readily disintegrated after soaking, for example, in a hammermill revolving at 10,000 rpm, fitted with a 0.25 inch circular opening. Whole corn kernels, being larger than most grains, require longer time for soaking. Good results are obtained with whole kernel corn under the conditions mentioned above by grinding through a 0.032 inch hammermill opening.

In soaking whole or large cracked particles of grains, it has been found desirable at times to discard the soak water. This is particularly true in preparing corn snacks from whole kernel corn. The sugars contained in the soak water adversely affect puffing quality and color of the finished snack. By discarding the water in which the corn is soaked, considerably more tolerance is provided in frying the finished product without scorching. The color problem is also alleviated with high-sugar products, such as corn or potatoes, by increasing the amount of added starch in the formulation.

Cracked grain products of small particle size are also most conveniently prepared for processing by soaking. In this case, because of the presence of fine particles, it is preferable not to remove the soak water; otherwise a large loss of product would result. A typical cracked wheat having a screen analysis of 12 percent on 7-mesh, 75 percent on 10-mesh, 9 percent on 20-mesh, with the balance fines, is processed by soaking in 2 to 4 parts of warm water, preferably within the range of 150° to 200°F., for about 1.5 hours. After this time, the particles are completely softened. When processing a cracked wheat of the size referred to above, it is not necessary to subject the soaked particles to further hammer-milling unless a completely homogenized product is desired. A unique, random, non-homogenized snack product is made in this manner.

A uniform or homogenized product is prepared from dry grains which are first ground into flour. In this process no previous soaking is needed because the particles rehydrate rapidly when combined with water and other ingredients used in the mixture.

Starch-containing tubers such as potatoes are processed into various types of snack products in accordance with this invention in several ways. For example, raw peeled potatoes are ground in conventional equipment and added directly to the process mixture. In this case care is taken to prevent enzymatic oxidation of the ground potatoes. This oxidation, which would cause darkening of the product and off-flavors, is prevented by familiar methods such as adding sulfur dioxide or other similar salts, or by excluding air.

The preferred method for producing a potato snack product with discrete particles of potato, however, is to blanch the potatoes prior to grinding. In this method the potatoes are first peeled, then cut into convenient size for blanching, for example, three-eighths inch slices. The slices are heated by hot water or by direct steam for a period of about 4 minutes at 200°F., which is normally sufficient to inactivate enzymes. Other conditions of piece size, time, and temperature may, of course, be used to obtain the same result. After blanching, the potatoes are cooled with water to stop the heat treatment. They may then be ground to any convenient size in conventional equipment, for example, through one-eighth inch round openings in a standard meat grinder. This ground product is immediately combined with the water and other ingredients in the formulation.

Alternatively, starch-containing tubers such as potatoes are thoroughly cooked and mashed before processing. In this method, the potatoes are peeled, sliced, cooked until soft, and mashed by convenient means known to the art. Removal of objectionable defects and eyes may take place at the same time the potatoes are mashed. The mashed potato is then added to the other ingredients in the formula.

Another alternative for processing starch-containing tubers is the use of dehydrated products. Although this alternative is not as desirable, it is advantageous in some cases where fresh tubers are not available. Using the methods described herein, satisfactory potato products have been prepared from dehydrated potatoes in the form of dehydrated mashed potatoes, using either potato flakes or potato granules, potato flour, and dehydrated diced potatoes ground to pass through a 60-mesh sieve. All of these products are well known to the art and are described in the book *Potato Processing* by Talburt and Smith, published by Avi.

It should be noted in the foregoing that in several cases the starch present in the foodstuff is gelatinized prior to adding the foodstuff to the mixture to be used in processing the present snack product. For example, in soaking wheat particles at temperatures above 160°F., at least partial gelatinization may occur. In processing blanched or cooked potatoes, the starch is essentially all gelatinized. This is also the case if the foodstuff is chosen from the group of dehydrated vegetables illustrated in which a cooking or blanching step had been used in the preparation of the dehydrated product. In the preferred practice of this invention, the slurry resulting from the mixture of the foodstuff prepared by any of the methods described above, additional added starch in the raw or ungelatinized state, and water are treated with heat to gelatinize substantially all of the starch present in the mixture, whether it was present in the foodstuff as ungelatinized starch or was added as an ingredient of the mixture.

In making the puffed snack food item of this invention, the mixture of water and a material containing ungelatinized starch is subjected to a temperature above the gelatinizing temperature of the starch. Preferably, the mixture contains from about 10 percent to about 40 percent starch solids and from about 60 percent to about 90 percent water. A mixture made with less than about 10 percent starch produces a weak gel which tears apart easily. Mixtures with more than about 40 percent total starch are usually dry and friable and must be extruded under high pressures to produce and retain the desired shape. We found that from about 15 percent to about 30 percent starch solids produces a mixture which forms a good gel which is easy to handle and results in a tasty final product.

The mixture may be heated by pumping the slurry with a positive displacement pump through a swept-surface heat exchanger to cook or gelatinzie the starch in the mixture. Such a heat exchanger is commonly known as a "Votator" in which steam is applied to a jacket surrounding the scraped surface to regulate the final temperature. The pumping rate is adjusted to give about one to about two minutes residence in the cooking chamber and the steam is adjusted to give a final temperature between 170°F. and 210°F., preferably about 185°F., depending on the type of starch in the mixture. The speed of agitation is adjusted high enough to prevent baking on the heating surface and is normally about 88 rpm. Excessive rates of shear are not desirable.

Alternatively, the heating is accomplished by injecting steam directly into the mixture as it is pumped through standard equipment known in the art as "starch cookers." Whichever method of heating is used, the mixture is agitated during the heating to provide substantially uniform heat distribution and gelatinization throughout the entire mixture to avoid formation of hard cores in the gel which do not puff when the material is subsequently subjected to deep-fat frying.

After the starch-water mixture is gelatinized, it preferably is extruded as a continuous, flat ribbon which can be of any convenient width from a few inches to several feet and has a thickness between about 50 and 125 mils. Alternatively, the gelatinized starch-water mixture is dropped on a moving belt in discrete blobs which assume the desired shape because the viscosity of the mixture is properly controlled by regulating the gelatinization time. A typical piece formed by dropping it on a moving belt is about 1 inch in diameter and about one-eighth inch thick.

Preferably, however, the gelatinized mixture is extruded onto an endless, open mesh moving belt. Since the mixture is relatively high in water content, it is extruded at a relatively low pressure, usually in the range of forty to 80 pounds per square inch, through a slot orifice 4 to 8 inches wide and three thirty-seconds inch high. The temperature of the extruded mixture is at or near the cooking temperature; therefore, the surfaces of the flat extruded ribbon begin to dry immediately. The ribbon is cut with conventional cutters into pieces of the desired shape, normally after it is dried to a water loss between about 4 percent and about 25 percent by weight. Typically, the pieces are about 1 inch square.

Improved handling and product quality are obtained by running the belt at a slightly higher speed than that of the extruded ribbon, so the ribbon is stretched in the direction of its travel and reduced in thickness. For example, the ribbon is extruded with a thickness of about 125 mils and stretched to a thickness of about 80 mils. This reduces the tendency of the ribbon to wrinkle and makes it possible to extrude ribbons which are substantially thinner than the discrete food particles which may be present.

Extrusion of the gelatinized mixture produces a superior product, particularly when food particles are incorporated into the mixture. Extrusion of the mixture produces a relatively thin ribbon in which the flat surfaces are shiny, incicating a continuous starch layer on the surface of the ribbon. The gel is susfficiently wet as it is extruded that the gelatinized starch can establish itself into a continuous surface after it emerges from the extrusion nozzle. The established network of starch gel on the surface of the extruded product aids in the entrappment of steam within the product when it is subsequently fried in cooking oil and results in a puffier, tastier product. Moreover, the thin ribbon is easier to cut into pieces than a thick loaf when food particles are present because of the reduced distance the cutter must travel through the gel and because of the protective gel film formed by the extrusion.

The relative high percentage of corn starch or equivalent high setback starch in the mixtures reduces the stickiness of the gel to a point where it can be easily cut without sticking to the cutters and removed from the teflon-coated endless belt.

After the pieces are cut, they are passed through a dryer to reduce the moisture content in the range of about 6 percent to about 14 percent by weight.

The dried pieces are then fried immediately in cooking oil to puff them to a density less than that of the oil, or they are stored for an indefinite time and subsequently fried and puffed in hot oil.

When a piece is fried in hot cooking oil, the relatively impermeable surface produced by the extrusion process retards the penetration of oil and tends to seal the water in the interior of the piece until the temperature of the interior is above the boiling point of the water, at which time the pressure from the inside of the piece suddenly blows it up and expands it to such a low specific gravity that it rises to the surface of the hot oil in which it is fried and facilitates its easy and automatic removal. The piece is drained of excess fat to produce a puffed, crisp fried-food snack.

The practice of the method of this invention as applied to different types of raw materials will be apparent from the following detailed examples.

EXAMPLE I

The composition by weight on a moisture-free basis of the formulation of Example I is shown in the following table:

TABLE 1

|  | % of Solids | % Starch in Mixture | % Amylose in Starch | % Amylose in Mixture |
| --- | --- | --- | --- | --- |
| Cracked Wheat | 34.20 | 29.30 | 26 | 7.62 |
| Whole Wheat Flour | 9.38 | 8.00 | 26 | 2.08 |
| Corn Starch | 41.50 | 41.50 | 28 | 11.61 |
| Corn Flour | 13.10 | 11.35 | 28 | 3.18 |
| Salt | 1.94 |  |  |  |
| TOTAL |  |  |  | 24.49 |

Cracked wheat having a screen analysis of 12 percent on U.S. No. 7 mesh, 75 percent on No. 10 mesh, 9 percent on No. 20 mesh, the balance passing under No. 20 mesh, was added to 3 times its weight of water, maintained at 170°F. for 1.5 hours. The soaked wheat was then combined with the other ingredients together with sufficient cold water to increase the moisture content of the mixture to 75 percent. This mixture was pumped through a scraped-surface heat exchanger, which provided about one minute residence time at a speed of 88 rpm. Sufficient steam was supplied to the jacket of the exchanger to raise the temperature to about 185°F. and substantially uniformly gelatinize the starch in the mixture. The cooked, gelatinized mixture was then extruded through a flat nozzle having an opening of 0.074 × 4 inches, which was large enough to permit the wheat particles distributed throughout the gelled mixture to pass without clogging. The strength of the gel was sufficient to hold the product in a coherent ribbon as it flowed from the extruder nozzle.

The ribbon of gel was deposited on an endless moving woven-wire mesh belt coated with teflon and exposed to a current of warm air until the moisture content reduced to between 70 percent and 75 percent. At this point, the surfaces of the gel were sufficiently dehydrated so that it could be cut by conventional cutters into pieces approximately 1 inch square. These pieces were then dried by conventional means at a temperature of about 160°F. to a final moisture content of 10 percent–12 percent. Some of the pieces were fried immediately in hydrogenated cottonseed oil maintained at 385°F. for about 20 seconds. The finished product had a uniformly puffed texture and provided a crisp, fried food snack with a fresh wheat flavor. Other pieces were stored in a sealed container for several weeks and thereafter fried to produce a puffed snack product as just described.

EXAMPLE I-A

The cracked wheat of Example I was replaced with the same quantity of whole wheat grains, which were soaked in water at room temperature until the wheat had a moisture content of about 40 percent by weight. The soaked wheat was then ground to pass through a one-fourth inch opening in a hammermill operated at 10,000 rpm. The ground wheat was mixed with the other ingredients as shown in Example I and the solid content again adjusted to 25 percent by the addition of cold water. After preparation, a finished fried wheat snack was substantially similar to the product prepared in Example I.

EXAMPLE I-B

The cracked wheat in Example I was replaced with a similar quantity of whole wheat flour. This product was mixed directly with the other ingredients in the formulation, including the additional whole wheat flour, and the solid content adjusted to 25 percent by adding cold water. This mixture was then cooked, extruded, dried, and fried in a manner similar to that used in Example I. The product had an appealing whole wheat flavor but did not have the random appearance of the partially broken wheat kernels which were apparent in the preceding Examples.

EXAMPLE II

The composition of the formulation of Example II had the composition by weight on a moisture-free basis as shown in the following table:

TABLE 2

| | % of Solids | % Starch in Mixture | % Amylose in Starch | % Amylose in Mixture |
|---|---|---|---|---|
| Potatoes | 37.60 | 32.30 | 21 | 6.78 |
| Corn Starch | 47.30 | 47.30 | 28 | 13.23 |
| Corn Flour | 11.80 | 10.80 | 28 | 3.02 |
| Salt | 3.23 | | | |
| TOTAL | | | | 23.13 |

Peeled raw potatoes, Russet Burbank variety, having about 20 percent solids, were cut into slices about one-fourth inch thick and blanched by placing the pieces in water at about 195°–200°F. for about 4.5 minutes. Under these conditions the enzymes normally associated with potato darkening were substantially inactivated. The blanched potatoes were cooled in a stream of tap water to halt the blanching step and then ground to pass through a one-eighth inch opening in a standard meat grinder. They were then combined with the other ingredients and the solid content adjusted to 25 percent by adding cold water. The product was then cooked and dried substantially as described under Example I. The character of the extruded gel was somewhat sticky, making handling difficult in the initial drying and cutting steps. The product, when fried in hydrogenated cottonseed oil at 375°F., provided a crisp fried-food snack with a fresh potato flavor, similar to a potato chip.

EXAMPLE III

The composition of the formulation of Example III had the composition by weight on a moisture-free basis as shown in the following table:

TABLE 3

| | % of Solids | % Starch in Mixture | % Amylose in Starch | % Amylose in Mixture |
|---|---|---|---|---|
| Potatoes | 30.10 | 29.50 | 21 | 6.20 |
| Corn Starch | 53.00 | 53.00 | 28 | 14.85 |
| Corn Flour | 13.20 | 11.40 | 28 | 3.19 |
| Salt | 3.62 | | | |
| TOTAL | | | | 24.24 |

In this Example the quantity of blanched potatoes was reduced in order to improve the handling characteristics of the cooked gel. The potatoes were cooked and the product prepared exactly as described in Example II. The cooked gel was noticeably less sticky and could be handled and cut with ease. The finished product had substantially the same flavor as that of Example II.

EXAMPLE IV

The composition of the formulation of Example IV had the composition by weight on a moisture-free basis as shown in the following table:

TABLE 4

| | % of Solids | % Starch in Mixture | % Amylose in Starch | % Amylose in Mixture |
|---|---|---|---|---|
| Whole Corn | 21.50 | 18.60 | 28 | 5.20 |
| Cracked Corn | 50.20 | 43.40 | 28 | 12.14 |
| Corn Starch | 24.00 | 24.00 | 28 | 6.72 |
| Salt | 4.30 | | | |
| TOTAL | | | | 24.06 |

Whole kernel corn and cracked corn (known as hominy grits) were combined in the ratio shown in Table 4 and soaked for 24 hours at 70°F. The soaked corn was then separated from the soak water, which was discarded. The grains were ground to pass through a 0.032 inch opening in a hammermill operated at 10,000 rpm. A portion of the water used in the formula was recirculated through the mill during grinding. The additional ingredients were combined with the ground corn and enough water to result in 25 percent total solids. This mixture was cooked as before at 185°F. and extruded onto the teflon-coated conveyor. This gel was particularly easy to handle and could be cut into the desired shape with a minimum of surface predrying. The pieces were then dried at 160°F. to a final moisture content of 10 percent–12 percent.

Some of the pieces were immediately fried in hydrogenated cottonseed oil held at a temperature of about 375°F. In about 20 seconds, the pieces puffed and rose to the surface of the cooking oil, from which they were removed and drained to provide a crisp fried-food snack with a fresh corn flavor. Other pieces of the dried gel were stored for 48 hours in an atmosphere of 50 percent relative humidity and then fried in oil at 375°F. These pieces also puffed to a crisp snack with a fresh corn flavor substantially the same as those fried immediately after drying.

EXAMPLE V

The composition of the formulation of Example V had the composition by weight on a moisture-free basis as shown in the following table:

TABLE 5

|  | % of Solids | % Starch in Mixture | % Amylose in Starch | % Amylose in Mixture |
|---|---|---|---|---|
| Whole Wheat | 34.20 | 29.30 | 26 | 7.62 |
| Whole Wheat Flour | 9.50 | 8.10 | 26 | 2.11 |
| Corn Starch | 41.50 | 41.50 | 28 | 11.62 |
| Rice Flour | 13.00 | 11.20 | 17 | 1.90 |
| Salt | 1.95 |  |  |  |
| TOTAL |  |  |  | 23.25 |

Whole wheat kernels were soaked at 145°F. for a period of 6 hours and ground substantially as described in Example I-A. The ground wheat was then combined with the remaining dry ingredients and the solid content adjusted to 30 percent by adding cold water. The product was then cooked at a rate of 300 pounds per hour and agitator speed of 88 rpm to a temperature of 191° ± 1°F. One portion of the product was extruded as a 1.25 inch diameter round roll or rod onto trays. These trays were then refrigerated for 6 hours until the gel became firm enough to slice. Slices were cut 0.095 inch thick. Considerable difficulty was encountered in slicing the gel because of the particles of wheat hull which were present in the product. The slices were dried at 160°F. and held for comparison with the remaining samples.

The second portion of this product was extruded through a 0.094 × 4 inch slot and collected on trays. This product was held refrigerated at 34°F. for the same length of time as the round extrusion. At the conclusion of this period, the product was cut into 1 inch squares and dried at 160°F.

The third portion of product was extruded through the slot measuring 0.094 × 4 inches onto perforated trays. This product was immediately predried for a period of ten minutes at 160°F. The partially-dried strips of gel were then cut into 1 inch square pieces and the drying continued.

The products of all samples were dried to a final moisture content of 10–12 percent. The products were then fried in hydrogenated cottonseed oil maintained at 385°F. Measurements were made of the average thickness of the dried and finish-fried products. A ratio of the puffed dimension divided by the same dimension before frying was defined as the puff index.

The first sample prepared from the round extrusion was rough appearing, dense, and had a puff index of 1.60. Because of the difficulties encountered in slicing the gel containing the particles of wheat, the surfaces of the finished dried product as well as the finished puffed snack were irregular and unappealing.

The second sample prepared from the flat extrusion cooled for six hours, had a puff index of 1.9, and, although puffed more uniformly than the first sample, it was dense and generally undesirable.

The third sample prepared from the predried gel strip had a puff index of 3.2. The texture of this product was uniformly light and tender with a desirable crisp texture with a good wheat floavor. The surface of the dry product was shiny and continuous.

EXAMPLE VI

The composition of the formulation of Example VI had the composition by weight on a moisture-free basis as shown in the following table:

TABLE 6

|  | % of Solids | % Starch in Mixture | % Amylose in Starch | % Amylose in Mixture |
|---|---|---|---|---|
| Cracked Wheat | 34.20 | 29.30 | 26 | 7.62 |
| Whole Wheat Flour | 9.38 | 8.00 | 26 | 1.89 |
| Potato Starch | 41.60 | 35.80 | 21 | 7.52 |
| Rice Flour | 13.00 | 11.20 | 17 | 1.90 |
| Salt | 1.94 |  |  |  |
| TOTAL |  |  |  | 18.93 |

The procedure of Example I was repeated on soaked cracked wheat; however, potato starch was used in place of corn starch and rice flour in place of corn flour. After cooking at 185°F. in the swept-surface heat exchanger, the resulting gel was extremely weak and sticky. Instead of forming a continuous ribbon which could be carried on a teflon-coated belt, it behaved like a viscous liquid, penetrating the pores of the belt from which it could be removed only with great difficulty. The mixture was discarded.

The foregoing Examples demonstrate the critical nature of the character and amount of starch used. If the percent of high setback starch, i.e., having a setback of more than 2.2, is such that the amylose or equivalent (such as acid-modified starch prepared from potatoes) is less than about 20 percent by weight in the formula on a moisture-free basis, the product is too difficult to handle commercially.

The process of this invention produces a puffed snack food item which is made from a starch gel with relatively high water content. Because of the water, much of the starch is gelatinized to form a gel which is easily extruded at low pressures, has sufficient strength to support itself in any shape given to it, and also supports discrete food particles, such as cracked wheat, or ground corn or potatoes, to produce a snack item with a fresh-food taste and an interesting, varied texture.

The use of the relatively high water content starch gel also permits the product to be made from raw material such as corn, wheat, and potatoes without ever having to dehydrate and rehydrate those materials, thereby improving the fresh-food taste of the final product and avoiding off-flavors which occur because of heat-damage during initial drying of such raw materials for grinding to flour.

I claim:

1. The process of making a puffed food product comprising the steps of:
   a. forming a slurry of a mixture of water, foodstuff, and at least one starch, the solids in the mixture including at least about 20 percent amylose by weight and available for gel formation;
   b. cooking and stirring the slurry at a temperature above the gelatinization temperature of the starch to form a thick gelatinized mass to facilitate puffing and expanding upon frying;
   c. forming the gelatinized mass into pieces;
   d. drying the pieces to a moisture content which causes the pieces to puff and expand on cooking; and
   e. cooking the dried pieces at a temperature which causes them to puff and expand.

2. The process according to claim 1 in which a major portion of the starch is corn starch.

3. The process according to claim 1 in which the slurry is heated to a temperature between about 170°F and about 210°F for between about 1 and about 30 minutes.

4. The process according to claim 1 in which the slurry contains between about 15 percent and about 30 percent starch by weight, and between about 60 percent and about 90 percent water by weight.

5. The process according to claim 1 which includes extruding the gelatinized mass at a temperature greater than about 140°F.

6. The process according to claim 1 which includes extruding the gelatinized mass in the form of a sheet less than about one-eighth in. thick.

7. The process according to claim 6 which includes extruding the sheet to a thickness between about 50 and about 125 mils.

8. The process according to claim 1 which includes extruding the gelatinized mass at a pressure less than about 80 psi.

9. The process according to claim 1 which includes extruding the gelatinized mass at a temperature greater than about 140°F to form a sheet, drying at least the surface of the sheet, and dividing the sheet into pieces within about ten minutes after extrusion.

10. The process according to claim 1 in which the starch has a setback of at least about 2.2 and is present in the slurry in the range of about 10 percent to about 40 percent by weight of the mixture.

11. The process according to claim 1 which includes drying the pieces prior to frying to a moisture content of about 6 percent and about 14 percent by weight of water.

12. The process according to claim 1 which includes frying the dried pieces in cooking oil at a temperature to cause them to puff to a density less than that of the cooking oil.

13. The process according to claim 1 which includes stirring the slurry during cooking in a scraped-surface heat exchanger.

14. The process according to claim 1 which includes adding raw potato particles to the slurry, extruding the gelatinized slurry, and stretching the extruded slurry to reduce its thickness to less than that of the potato particles.

15. The process according to claim 14 in which the raw potato particles are blanched prior to adding to the slurry.

16. The process according to claim 14 in which at least some of the potato particles have minimum dimensions greater than 1/32 in.

17. The process according to claim 1 which includes storing the dried pieces in an atmosphere of less than about 50 percent relative humidity for at least 24 hours and thereafter frying the dried pieces in hot oil at a temperature sufficiently high to puff the pieces to a density less than that of the oil.

* * * * *